US012456428B2

(12) United States Patent
Seo et al.

(10) Patent No.: US 12,456,428 B2
(45) Date of Patent: Oct. 28, 2025

(54) DISPLAY DEVICE AND METHOD OF DRIVING THE SAME

(71) Applicant: Samsung Display Co., LTD., Yongin-si (KR)

(72) Inventors: Young Kyo Seo, Yongin-si (KR); Ji Hye Moon, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/825,046

(22) Filed: Sep. 5, 2024

(65) Prior Publication Data

US 2025/0265988 A1 Aug. 21, 2025

(30) Foreign Application Priority Data

Feb. 19, 2024 (KR) ........................ 10-2024-0023549

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01); *G09G 2300/0861* (2013.01); *G09G 2320/0238* (2013.01); *G09G 2320/0252* (2013.01); *G09G 2330/02* (2013.01)

(58) Field of Classification Search
CPC ............... G09G 3/3233; G09G 3/3291; G09G 2300/0819; G09G 2300/0842; G09G 2300/0861; G09G 2320/0238; G09G 2320/0252; G09G 2320/02
See application file for complete search history.

(56) References Cited

U.S. PATENT DOCUMENTS

| | | | | |
|---|---|---|---|---|
| 9,953,573 | B2 | 4/2018 | Pyo et al. | |
| 10,515,584 | B2 | 12/2019 | Cho et al. | |
| 10,997,909 | B2 | 5/2021 | Pyo et al. | |
| 11,017,727 | B2 | 5/2021 | Pyo | |
| 2019/0221165 | A1 * | 7/2019 | Park | G09G 3/3258 |
| 2019/0304372 | A1 | 10/2019 | Pyo et al. | |
| 2023/0306907 | A1 | 9/2023 | Park et al. | |

FOREIGN PATENT DOCUMENTS

| | | | |
|---|---|---|---|
| KR | 1020190064200 | A | 6/2019 |
| KR | 1020210007508 | A | 1/2021 |
| KR | 1020210080789 | A | 7/2021 |
| KR | 102417983 | B1 | 7/2022 |
| KR | 1020220095467 | A | 7/2022 |

OTHER PUBLICATIONS

Extended European Search Report issued Jun. 3, 2025 in EP Application No. 25157568.4, 15 pages.

* cited by examiner

*Primary Examiner* — Sardis F Azongha
(74) *Attorney, Agent, or Firm* — CANTOR COLBURN LLP

(57) ABSTRACT

A display device includes a display panel including a pixel, a data driver which provides a data voltage to the pixel, a power voltage generator which provides a first initialization voltage and a first power voltage to the pixel, and a driving controller which controls the data driver and the power voltage generator, and the driving controller determines a difference between the first initialization voltage and the first power voltage based on an input luminance.

20 Claims, 8 Drawing Sheets

FIG. 3

| DBV (nits) | ELVDD (V) | ELVSS (V) | VAR(VAINT-ELVSS) (V) |
|---|---|---|---|
| 1600 | +2.8 | -5.7 | +0.10 |
| 1200 | +2.8 | -5.4 | +0.15 |
| 650 | +2.8 | -5.1 | +0.20 |
| 300 | +2.8 | -4.8 | +0.25 |
| 200 | +2.8 | -4.5 | +0.30 |
| 100 | +2.8 | -4.2 | +0.35 |
| 90 | +2.8 | -3.9 | +0.40 |
| 60 | +2.8 | -3.6 | +0.45 |
| 30 | +2.8 | -3.3 | +0.50 |
| 15 | +2.8 | -3.0 | +0.55 |
| 10 | +2.8 | -2.7 | +0.60 |
| 4 | +2.8 | -2.4 | +0.65 |

FIG. 4

| DBV (nits) | ELVDD (V) | ELVSS (V) | DIM | VB | VAR(VAINT-ELVSS) (V) |
|---|---|---|---|---|---|
| 1600 | +2.8 | -3.0 | | | +0.65 |
| 1200 | +2.8 | -3.0 | | | +0.60 |
| 650 | +2.8 | -3.0 | | | +0.55 |
| 300 | +2.8 | -3.0 | | | +0.50 |
| 200 | +2.8 | -3.0 | | | +0.45 |
| 100 | +2.8 | -3.0 | DECREASE | DECREASE | +0.40 |
| 90 | +2.8 | -3.0 | | | +0.35 |
| 60 | +2.8 | -3.0 | | | +0.30 |
| 30 | +2.8 | -3.0 | | | +0.25 |
| 15 | +2.8 | -3.0 | | | +0.20 |
| 10 | +2.8 | -3.0 | | | +0.15 |
| 4 | +2.8 | -3.0 | | | +0.10 |

FIG. 5

| DBV (nits) | ELVDD (V) | ELVSS (V) | DIM | VB | VAR(VAINT−ELVSS) (V) | |
|---|---|---|---|---|---|---|
| 2175 | +2.8 | −5.7 | SAME | SAME | +0.10 | |
| 1600 | +2.8 | −5.7 | | | +0.10 | P1 |
| 1200 | +2.8 | −5.3 | | | +0.15 | |
| 650 | +2.8 | −3.6 | | | +0.40 | |
| 300 | +2.8 | −2.7 | | | +0.55 | |
| 200 | +2.8 | −2.5 | | | +0.55 | |
| 100 | +2.8 | −2.3 | | | +0.60 | |
| 90 | +2.8 | −2.3 | DECREASE | DECREASE | +0.50 | P2 |
| 60 | +2.8 | −2.3 | | | +0.35 | |
| 30 | +2.8 | −2.3 | | | +0.35 | |
| 15 | +2.8 | −2.3 | | | +0.30 | |
| 10 | +2.8 | −2.3 | | | +0.30 | |
| 4 | +2.8 | −2.3 | | | +0.30 | |

FIG. 6

| VAR | 0.1V | 0.2V | 0.3V | 0.4V | 0.5V |
|---|---|---|---|---|---|
| AVERAGE | 5.56 | 5.66 | 5.87 | 6.16 | 6.36 |
| STDEV | 0.1 | 0.13 | 0.2 | 0.21 | 0.13 |
| Ppk | 2.09 | 1.37 | 0.57 | 0.06 | −0.41 |
| OOS (%) | 0.00% | 0.10% | 4.30% | 45.40% | 93.90% |

DISPLAY DEVICE AND METHOD OF DRIVING THE SAME

This application claims priority to Korean Patent Application No. 10-2024-0023549, filed on Feb. 19, 2024, and all the benefits accruing therefrom under 35 U.S.C. § 119, the content of which in its entirety is herein incorporated by reference.

BACKGROUND

1. Field

The disclosure relates to a display device and a method of driving the display device.

2. Description of the Related Art

As information technology develops, the importance of a display device, which is a connection medium between a user and information, is emerging. Accordingly, display devices such as a liquid crystal display device, an organic light emitting display device, and an inorganic light emitting display device are widely used in various fields.

SUMMARY

Embodiments of the disclosure provide a display device that determines a difference between a first initialization voltage and a first power voltage based on input luminance.

Embodiments of the disclosure provide a method of driving a display device.

According to embodiments of the disclosure, a display device includes a display panel including a pixel, a data driver which provides a data voltage to the pixel, a power voltage generator which provides a first initialization voltage and a first power voltage to the pixel, and a driving controller which controls the data driver and the power voltage generator, where the driving controller may determine a difference between the first initialization voltage and the first power voltage based on an input luminance.

In an embodiment, the driving controller may determine the first power voltage based on the input luminance and then determine the first initialization voltage based on the difference and the first power voltage.

In an embodiment, the first power voltage may increase as the input luminance decreases, and the difference may increase as the input luminance decreases.

In an embodiment, the power voltage generator may further provide a second power voltage to the pixel, and the second power voltage may be constant.

In an embodiment, the driving controller may determine a dimming level and a black voltage based on the input luminance, and the first power voltage may be constant.

In an embodiment, the dimming level may decrease as the input luminance decreases, and the black voltage may decrease as the input luminance decreases.

In an embodiment, the difference may decrease as the input luminance decreases.

In an embodiment, the driving controller may determine the first power voltage based on the input luminance when the input luminance is in a first range and then determine the first initialization voltage based on the difference and the first power voltage, and the first power voltage may be constant when the input luminance is in a second range different from the first range.

In an embodiment, the input luminance in the second range may be lower than the input luminance in the first range.

In an embodiment, the first power voltage when the input luminance is in the second range may be higher than or equal to the first power voltage when the input luminance is in the first range.

In an embodiment, a dimming level and a black voltage may be constant when the input luminance is in the first range.

In an embodiment, the first power voltage may increase as the input luminance decreases when the input luminance is in the first range, and the difference may increase as the input luminance decreases when the input luminance is in the first range.

In an embodiment, when the input luminance is in the second range, the driving controller may determine a dimming level and a black voltage based on the input luminance.

In an embodiment, the dimming level may decrease as the input luminance decreases when the input luminance is in the second range, and the black voltage may decrease as the input luminance decreases when the input luminance is in the second range.

In an embodiment, the difference may decrease as the input luminance decreases when the input luminance is in the second range.

In an embodiment, the pixel may include a first transistor which generates a driving current, a storage capacitor connected to a control electrode of the first transistor, a second transistor which writes the data voltage to the storage capacitor, a light emitting element which receives the driving current to emit light and receives the first power voltage, and a seventh transistor which provides the first initialization voltage to the light emitting element.

According to embodiments of the disclosure, a method of driving a display device includes determining an input luminance, determining a difference between a first initialization voltage and a first power voltage based on the input luminance, determining the first power voltage, and determining the first initialization voltage based on the difference and the first power voltage.

In an embodiment, the first power voltage may be determined based on the input luminance when the input luminance is in a first range, the first power voltage may be constant when the input luminance is in a second range different from the first range, and the input luminance in the second range may be lower than the input luminance in the first range.

In an embodiment, the first power voltage may increase as the input luminance decreases when the input luminance is in the first range, and the difference may increase as the input luminance decreases when the input luminance is in the first range.

In an embodiment, the method may further include determining a dimming level and a black voltage based on the input luminance when the input luminance is in the second range, the dimming level may decrease as the input luminance decreases when the input luminance is in the second range, the black voltage may decrease as the input luminance decreases when the input luminance is in the second range, and the difference may decrease as the input luminance decreases when the input luminance is in the second range.

The display device according to embodiments of the disclosure may determine the difference between the first initialization voltage and the first power voltage based on the input luminance, thereby effectively preventing a black luminance from increasing and improving an image quality characteristic at a low luminance.

However, an effect of the disclosure is not limited to the above-described effect, and may be variously expanded within a range that does not deviate from the spirit and scope of the disclosure.

BRIEF DESCRIPTION OF THE DRAWINGS

The above and other features of the disclosure will become more apparent by describing in further detail embodiments thereof with reference to the accompanying drawings, in which:

FIG. 3 is a table illustrating an example in which a driving controller of FIG. 1 determines a difference between a first initialization voltage and a first power voltage;

FIG. 4 is a table illustrating an example in which a driving controller of a display device according to embodiments of the disclosure determines a difference between a first initialization voltage and a first power voltage;

FIG. 5 is a table illustrating an example in which a driving controller of a display device according to embodiments of the disclosure determines a difference between a first initialization voltage and a first power voltage;

FIG. 6 is a table illustrating an example in which the display device of FIG. 1 experimentally determines the difference between the first power voltage and the first initialization voltage;

DETAILED DESCRIPTION

Figure 1:
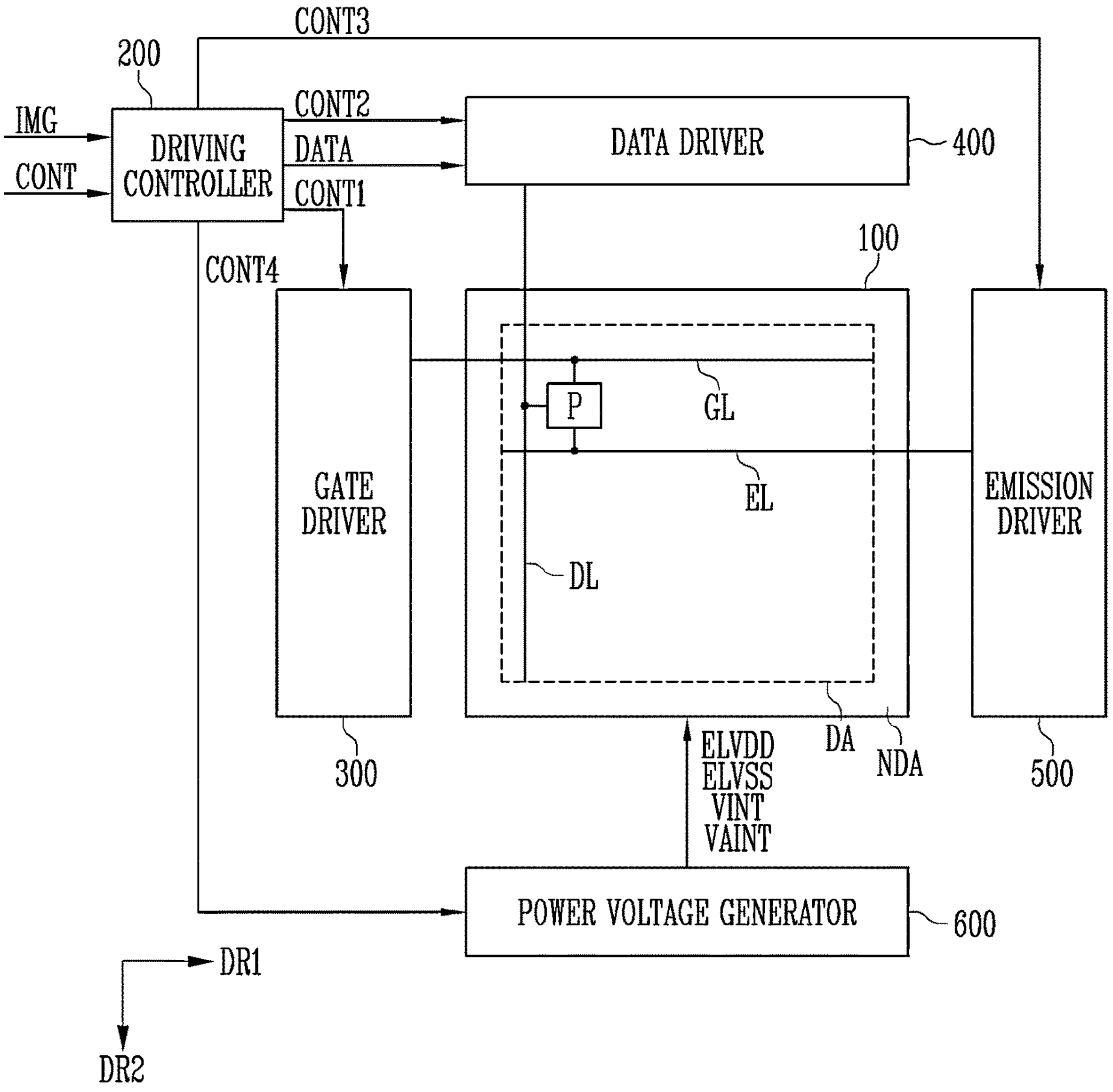
FIG. 1 is a block diagram illustrating a display device according to embodiments of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

Throughout the specification, in a case where a portion is "connected" to another portion, the case includes not only a case where the portion is "directly connected" but also a case where the portion is "indirectly connected" with another element interposed therebetween.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. Thus, reference to "an" element in a claim followed by reference to "the" element is inclusive of one element and a plurality of the elements. For example, "an element" has the same meaning as "at least one element," unless the context clearly indicates otherwise. "At least one" is not to be construed as limiting "a" or "an." "At least one of X, Y, and Z" and "at least one selected from X, Y, and Z" may be interpreted as one X, one Y, one Z, or any combination of two or more of X, Y, and Z (for example, XYZ, XYY, YZ, and ZZ). "Or" means "and/or." As used herein, the term "and/or" includes all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Here, terms such as first and second may be used to describe various components, but these components are not limited to these terms. These terms are used to distinguish one component from another component. Therefore, a first component may refer to a second component within a range without departing from the scope disclosed herein.

Spatially relative terms such as "under", "on", and the like may be used for descriptive purposes, thereby describing a relationship between one element or feature and another element(s) or feature(s) as shown in the drawings. Spatially relative terms are intended to include other directions in use, in operation, and/or in manufacturing, in addition to the direction depicted in the drawings. For example, when a device shown in the drawing is turned upside down, elements depicted as being positioned "under" other elements or features are positioned in a direction "on" the other elements or features. Therefore, in an embodiment, the term "under" may include both directions of on and under. In addition, the device may face in other directions (for example, rotated 90 degrees or in other directions) and thus the spatially relative terms used herein are interpreted according thereto.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Various embodiments are described with reference to drawings schematically illustrating ideal embodiments. Accordingly, it will be expected that shapes may vary, for example, according to tolerances and/or manufacturing techniques. Therefore, the embodiments disclosed herein cannot be construed as being limited to specific shapes shown in the drawings, and should be interpreted as including, for example, changes in shapes that occur as a result of manufacturing. As described above, the shapes shown in the drawings may not show actual shapes of areas of a device, and the embodiments are not limited thereto.

Hereinafter, embodiments of the disclosure will be described in detail with reference to the accompanying drawings.

FIG. 1 is a block diagram illustrating a display device according to embodiments of the disclosure.

Referring to FIG. 1, an embodiment of the display device may include a display panel 100, a driving controller 200, a gate driver 300, a data driver 400, an emission driver 500, and a power voltage generator 600. In an embodiment, at least two selected from the driving controller 200, the data driver 400, and the power voltage generator 600 may be integrated into one chip.

The display panel 100 may include a display area DA on which an image is displayed and a non-display area NDA disposed adjacent to the display area DA. No image may be displayed in the non-display area NDA. In an embodiment, the gate driver 300 and the emission driver 500 may be mounted in the non-display area NDA.

The display panel 100 may include a plurality of gate lines GL, a plurality of data lines DL, a plurality of emission lines EL, and a plurality of pixel P electrically connected to the gate lines GL, the data lines DL and the emission lines EL. The gate lines GL and the emission lines EL may extend in a first direction DR1, and the data lines DL may extend in a second direction DR2 crossing the first direction DR1.

The driving controller 200 may receive input image data IMG and an input control signal CONT from a main processor (for example, a graphic processing unit (GPU) or the like). In an embodiment, for example, the input image data IMG may include red image data, green image data, and blue image data. In an embodiment, the input image data IMG may further include white image data. In another embodiment, for example, the input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 may generate a first control signal CONT1, a second control signal CONT2, a third control signal CONT3, a fourth control signal CONT4, and a data signal DATA based on the input image data IMG and the input control signal CONT.

The driving controller 200 may generate the first control signal CONT1 for controlling an operation of the gate driver 300 based on the input control signal CONT and output the first control signal CONT1 to the gate driver 300. The first control signal CONT1 may include a vertical start signal and a gate clock signal.

The driving controller 200 may generate the second control signal CONT2 for controlling an operation of the data driver 400 based on the input control signal CONT and output the second control signal CONT2 to the data driver 400. The second control signal CONT2 may include a horizontal start signal and a load signal.

The driving controller 200 may generate the data signal DATA based on the input image data IMG and the input control signal CONT. The driving controller 200 may output the data signal DATA to the data driver 400.

The driving controller 200 may generate the third control signal CONT3 for controlling an operation of the emission driver 500 based on the input control signal CONT and output the third control signal CONT3 to the emission driver 500. The third control signal CONT3 may include a vertical start signal and an emission clock signal.

The driving controller 200 may generate the fourth control signal CONT4 for controlling an operation of the power voltage generator 600 based on the input control signal CONT and output the fourth control signal CONT4 to the power voltage generator 600. The fourth control signal CONT4 may include a voltage value of at least one of power voltages ELVDD, ELVSS, VINT, and VAINT.

The gate driver 300 may generate gate signals for driving the gate lines GL in response to the first control signal CONT1 received from the driving controller 200. The gate driver 300 may output the gate signals to the gate lines GL. In an embodiment, for example, the gate driver 300 may sequentially output the gate signals to the gate lines GL.

The data driver 400 may receive the second control signal CONT2 and the data signal DATA from the driving controller 200. The data driver 400 may generate data voltages obtained by converting the data signal DATA into an analog voltage. The data driver 400 may output the data voltages to the data line DL.

The emission driver 500 may generate emission signals for driving the emission lines EL in response to the third control signal CONT3 received from the driving controller 200. The emission driver 500 may output the emission signals to the emission lines EL. In an embodiment, for example, the emission driver 500 may sequentially output the emission signals to the emission lines EL.

The power voltage generator 600 may generate the power voltages ELVDD, ELVSS, VINT, and VAINT for driving the display panel 100 in response to the third control signal CONT3 received from the driving controller 200. The power voltage generator 600 may output the power voltages ELVDD, ELVSS, VINT, and VAINT to the display panel 100.

Figure 2:
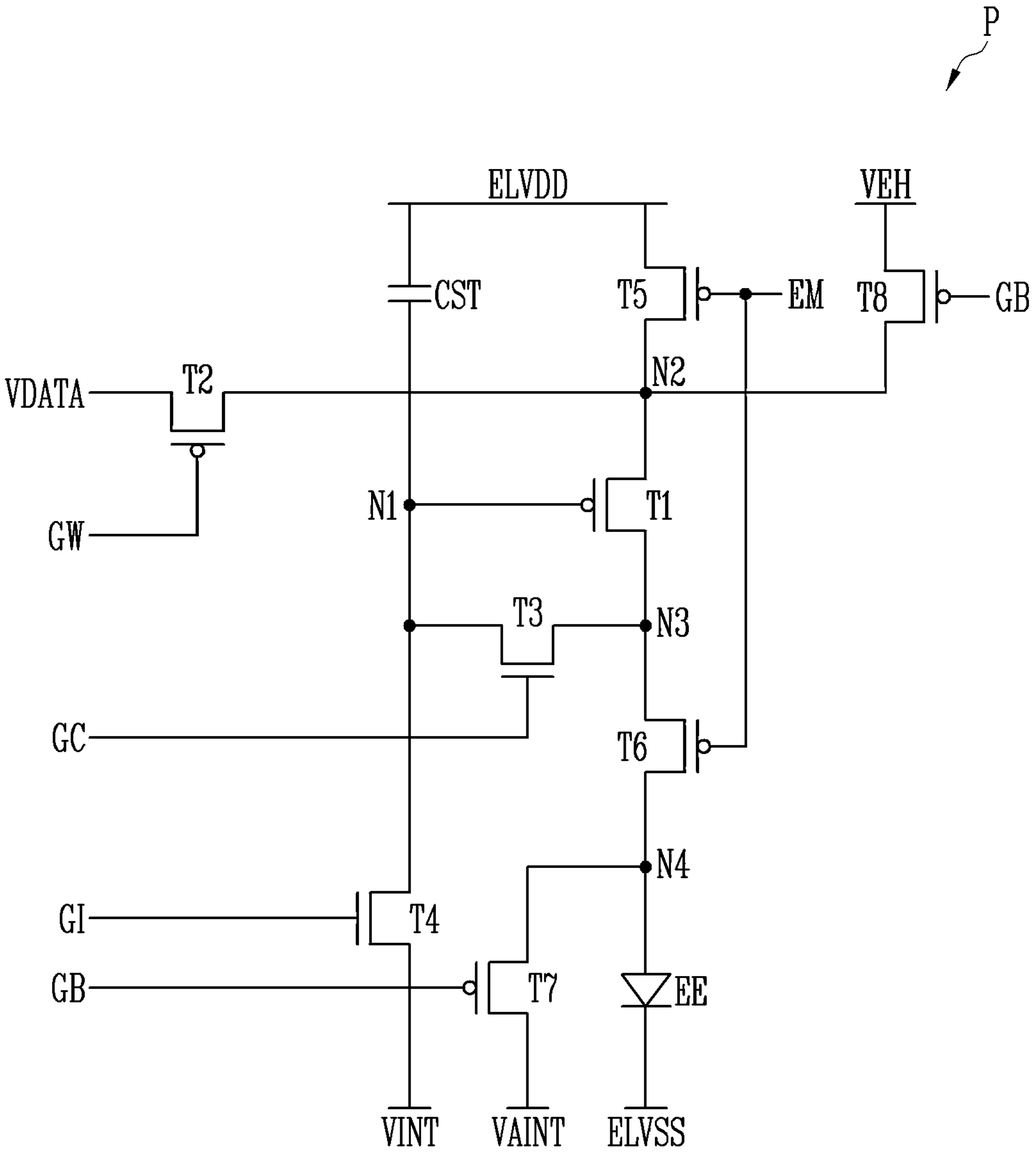
FIG. 2 is a circuit diagram illustrating an example of a pixel of the display device of FIG. 1.

FIG. 2 is a circuit diagram illustrating an example of the pixel of the display device of FIG. 1.

Referring to FIG. 2, each of the pixels P may include a first transistor T1 (that is, a driving transistor) that generates a driving current, a storage capacitor CST connected to a control electrode of the first transistor T1, a second transistor T2 that writes a data voltage VDATA to the storage capacitor CST, a light emitting element EE that receives the driving current to emit light, and receives a first power voltage ELVSS (for example, a low power voltage), and a seventh transistor T7 that provides a first initialization voltage VAINT to the light emitting element EE.

In an embodiment, for example, each of the pixels P may include the first transistor T1 (that is, the driving transistor) including the control electrode connected to a first node N1, a first electrode connected to a second node N2, and a second electrode connected to a third node N3, the second transistor T2 including a control electrode that receives a write gate signal GW, a first electrode that receives the data voltage VDATA, and a second electrode connected to the second node N2, a third transistor T3 including a control electrode that receives a compensation gate signal GC, a first electrode connected to the third node N3, and a second electrode connected to the first node N1, a fourth transistor T4 including a control electrode that receives an initialization gate signal GI, a first electrode that receives a second initialization voltage VINT, and a second electrode connected to the first node N1, a fifth transistor including a control electrode that receives the emission signal EM, a first electrode that receives a second power voltage ELVDD (for example, a high power voltage), and a second electrode connected to the second node N2, a sixth transistor T6 including a control electrode that receives the emission signal EM, a first electrode connected to the third node N3, and a second electrode connected to a fourth node N4, the seventh transistor T7 including a control electrode that receives a bias gate signal GB, a first electrode that receives the first initialization voltage VAINT, and a second electrode connected to the fourth node N4, an eighth transistor T8 including a control electrode that receives the bias gate signal GB, a first electrode that receives a bias voltage VEH, and a second electrode connected to the second node N2, the storage capacitor CST including a first electrode that receives the second power voltage ELVDD and a second electrode connected to the first node N1, and the light emitting element EE including a first electrode (that is, an anode electrode) connected to the fourth node N4 and a second electrode (that is, a cathode electrode) that receives the first power voltage ELVSS (for example, the low power voltage. However, a structure of the pixel P is not limited to that shown in FIG. 2.

Hereinafter, for convenience of description, an embodiment where the third and fourth transistors T3 and T4 are implemented as n-channel metal oxide semiconductor (NMOS) transistors will be described. In another embodiment, the third and fourth transistors T3 and T4 may be implemented as p-channel metal oxide semiconductor (PMOS) transistors.

Hereinafter, for convenience of description, an embodiment where the first, second, and fifth to eighth transistors T1, T2, T5, T6, T7, and T8 are implemented as PMOS transistors will be described. In another embodiment, the first, second, and fifth to eighth transistors T1, T2, T5, T6, T7, and T8 may be implemented as NMOS transistors.

In a case of the NMOS transistor, a low voltage level may be a deactivation level, and a high voltage level may be an activation level. For example, when a signal applied to a control electrode of the NMOS transistor has the low voltage level, the NMOS transistor may be turned off. For example, when the signal applied to the control electrode of the NMOS transistor has the high voltage level, the NMOS transistor may be turned on. In a case of the PMOS transistor, the low voltage level may be an activation level, and the high voltage level may be a deactivation level. For example, when a signal applied to a control electrode of the PMOS transistor has the low voltage level, the PMOS transistor may be turned on. For example, when the signal applied to the control electrode of the PMOS transistor has the high voltage level, the PMOS transistor may be turned off. That is, the activation level and deactivation level may be determined based on a type of a transistor.

In an embodiment where the first transistor T1 (that is, the driving transistor T1) is the PMOS transistor, as a voltage of the first node N1 increases, a size of the driving current may decrease. Therefore, as a size of the data voltage VDATA increases, a size of a voltage written to the storage capacitor CST may increase, the size of the driving current may decrease, and a luminance may decrease. That is, as a black voltage increases, a luminance at the lowest grayscale may decrease. Here, the black voltage refers to the data voltage VDATA at the lowest grayscale.

Hereinafter, embodiments where the first transistor T1 is implemented as the PMOS transistor will be mainly described, and thus, in such embodiments, as the black voltage increases, a black grayscale (that is, a luminance at the lowest grayscale) decreases. However, in another embodiment, the first transistor T1 is not limited to the PMOS transistor.

In an embodiment, for example, in an initialization period, the initialization gate signal GI may have an activation level and the fourth transistor T4 may be turned on. Accordingly, the second initialization voltage VINT may be applied to the first node N1. That is, the control electrode (that is, the storage capacitor CST) of the first transistor T1 may be initialized.

In an embodiment, for example, in a data write period, the write gate signal GW and the compensation gate signal GC may have an activation level, and the second transistor T2 and the third transistor T3 may be turned on. Accordingly, the data voltage VDATA may be written to the storage capacitor CST.

In an embodiment, for example, in a bias initialization period, the bias gate signal GB may have an activation level, and the seventh transistor T7 and the eighth transistor T8 may be turned on. Accordingly, the first initialization voltage VAINT (that is, an anode initialization voltage) may be applied to the first electrode (that is, the anode electrode) of the light emitting element EE, and the bias voltage VEH may be applied to the first node of the first transistor T1.

In an embodiment, for example, in an emission period, the emission signal EM may have an activation level, and the fifth transistor T5 and the sixth transistor T6 may be turned on. Accordingly, the second power voltage ELVDD may be applied to the first transistor T1 to generate the driving current, and the driving current may be applied to the light emitting element EE. That is, the light emitting element EE may emit light with a luminance corresponding to the driving current.

FIG. 3 is a table illustrating an example in which the driving controller of FIG. 1 determines a difference between the first initialization voltage and the first power voltage.

In FIG. 3, a unit of an input luminance DBV is nits, and a unit of the first and second power voltages ELVSS and ELVDD and the difference VAR between the first power voltage ELVSS and the first initialization voltage VAINT is volt (V).

Referring to FIGS. 1 and 3, in an embodiment, the driving controller 200 may determine the difference VAR between the first initialization voltage VAINT and the first power voltage ELVSS based on the input luminance DBV. The first initialization voltage VAINT may be greater than the first power voltage ELVSS. In an embodiment, a dimming level DIM (refer to FIG. 4) and a black voltage VB (refer to FIG. 4) to be described later may be constant.

The input luminance DBV may be set manually by a user of the display device, or may be set automatically using an illumination sensor provided in the display device. The input luminance DBV may be a luminance corresponding to a maximum grayscale among grayscales. In an embodiment, for example, when the input image data IMG (refer to FIG. 1) includes 256 grayscales (0 to 255 grayscales), the input luminance DBV may be a luminance corresponding to 255 grayscales.

The second power voltage ELVDD may have a constant value regardless of the input luminance DBV. In an embodiment, for example, the second power voltage ELVDD may be 2.8 V. However, a size of the second power voltage ELVDD is not limited thereto.

The driving controller 200 may determine the first power voltage ELVSS based on the input luminance DBV and then determine the first initialization voltage VAINT. In an embodiment, the first power voltage ELVSS may increase as the input luminance DBV decreases.

In an embodiment, as the first power voltage ELVSS increases, a voltage difference between the first power voltage ELVSS and the second power voltage ELVDD may decrease. Accordingly, a voltage between the first electrode and the second electrode of the light emitting element EE (refer to FIG. 2) may decrease and a luminance may decrease. That is, the driving controller 200 may cause the display device to emit light with a luminance corresponding to the input luminance DBV by adjusting a size of the first power voltage ELVSS.

As the difference VAR increases, a response speed (first frame response (FFR)) and a temperature characteristic (temperature luminance sensitivity) at a low luminance may be improved. However, as the difference VAR increases, the black luminance may increase. The display device may effectively prevent a black luminance from increasing and improve an image quality characteristic at a low luminance by determining the difference VAR based on the input luminance DBV.

In an embodiment, for example, the difference VAR may increase as the input luminance DBV decreases. When the voltage difference between the first power voltage ELVSS and the second power voltage ELVDD decreases, the black luminance may decrease. A margin for increasing the black luminance may be secured by a decrease of the black luminance. That is, the difference VAR may increase in response to the decrease of the black luminance.

In an embodiment, as described above, the difference VAR may be desired to change when the input luminance DBV changes, but the disclosure is not limited thereto. In an embodiment, for example, the difference VAR may be the same or constant in a certain range of the input luminance DBV.

In an embodiment, the difference VAR may change at a regular interval, but the disclosure is not limited thereto.

FIG. 4 is a table illustrating an example in which a driving controller of a display device according to embodiments of the disclosure determines a difference between a first initialization voltage and a first power voltage.

In FIG. 4, a unit of the input luminance DBV is nits, and a unit of the first and second power voltages ELVSS and ELVDD and the difference VAR between the first power voltage ELVSS and the first initialization voltage VAINT is volt (V).

Since the display device according to embodiments of FIG. 4 is substantially the same as a configuration of embodiments of the display device of FIGS. 1 to 3 except for a process of determining the difference VAR, the same reference numbers and reference symbols are used for identical or similar components, and any repetitive detailed description thereof will be omitted.

Referring to FIGS. 1 and 4, in an embodiment, the driving controller 200 may determine the dimming level DIM and the black voltage VB based on the input luminance DBV. The first power voltage ELVSS may be constant. The dimming level DIM may be a level corresponding to a light emission time in one frame, and as the dimming level DIM increases, the light emission time in one frame may increase. The black voltage VB may be the data voltage VDATA (refer to FIG. 2) at the lowest grayscale.

In an embodiment, the dimming level DIM may decrease as the input luminance DBV decreases. When the dimming level DIM decreases, since the light emission time decreases, a luminance may decrease. That is, the driving controller 200 may cause the display device to emit light with a luminance corresponding to the input luminance DBV by adjusting the dimming level DIM.

When the dimming level DIM decreases, the black luminance may decrease. The driving controller 200 may increase the black luminance by decreasing the black voltage VB in response to a decrease of the black luminance by the dimming level DIM. That is, the black voltage VB may decrease as the input luminance DBV decreases.

Since the first initialization voltage VAINT is a voltage for initializing the light emitting element EE (refer to FIG. 2), the first initialization voltage VAINT may decrease as a decrease of the black voltage VB. Therefore, the difference VAR may decrease as the input luminance DBV decreases.

In an embodiment, the difference VAR is desired to change when the input luminance DBV changes, but the disclosure is not limited thereto. For example, the difference VAR may be the same or constant in a certain range of the input luminance DBV.

In an embodiment, the difference VAR may change at a regular interval, but the disclosure is not limited thereto.

FIG. 5 is a table illustrating an example in which a driving controller of a display device according to embodiments of the disclosure determines a difference between a first initialization voltage and a first power voltage.

In FIG. 5, a unit of the input luminance DBV is nits, and a unit of the first and second power voltages ELVSS and ELVDD and the difference VAR between the first power voltage ELVSS and the first initialization voltage VAINT is a volt (V).

An operation at the input luminance DBV in a first range (or section) P1 according to an embodiment of FIG. 5 is substantially the same as that of FIG. 3, and an operation at the input luminance DBV in a second range (or section) P2 is substantially the same as that of FIG. 4. Therefore, the same reference numbers and symbols are used for identical or similar components, and any repetitive detailed description thereof will be omitted.

Referring to FIGS. 1 and 5, in an embodiment, the input luminance DBV may include the first range P1 and the second range P2. The input luminance DBV in the second range P2 may be lower than the input luminance DBV in the first range P1.

The driving controller 200 may determine the first power voltage ELVSS based on the input luminance DBV in the first range P1 and then determine the first initialization voltage VAINT. The first power voltage ELVSS may be constant when (or while) the input luminance DBV is in the second range P2.

When the input luminance DBV is in the first range P1, the first power voltage ELVSS may increase as the input luminance DBV decreases, and the difference VAR may increase as the input luminance DBV decreases when the input luminance DBV is in the first range P1. The dimming level DIM and the black voltage VB may be constant when the input luminance DBV is in the first range P1.

The first power voltage ELVSS when the input luminance DBV is in the second range P2 may be higher than or equal to the first power voltage ELVSS when the input luminance DBV is in the first range P1. When the input luminance DBV is in the second range P2, the driving controller 200 may determine the dimming level DIM and the black voltage VB based on the input luminance DBV. The dimming level DIM may decrease as the input luminance DBV decreases when the input luminance DBV is in the second range P2, the black voltage VB may decrease as the input luminance DBV decreases when the input luminance DBV is in the second range P2, and the difference VAR may decrease as the input luminance DBV decreases when the input luminance DBV is in the second range P2.

In an embodiment, the first power voltage ELVSS, the dimming level DIM, the black voltage VB, and the difference VAR may be constant when the input luminance DBV is in a specific range. For example, when the input luminance DBV is 2175 nits, the image may be displayed in 20% of the display area DA (refer to FIG. 1), and when the input luminance DBV is 1600 nits, the image may be displayed in 100% of the display area DA (refer to FIG. 1)

In an embodiment, the difference VAR may be the same or constant in a certain range of the input luminance DBV, but the disclosure is not limited thereto. In another embodiment, for example, the difference VAR may change when the input luminance DBV in the certain range changes.

FIG. 6 is a table illustrating an example in which the display device of FIG. 1 experimentally determines the difference between the first power voltage and the first initialization voltage.

FIG. 6 illustrates an example of the difference VAR determined based on one input luminance DBV.

Referring to FIG. 6, in an embodiment, the difference VAR may be determined experimentally. In an embodiment, for example, the black luminance may be preset. In addition, the black voltage that achieves the black luminance may be measured a plurality of times. A process performance index Ppk and a spec out ratio (or out-of-specification ratio) OOS may be measured through an average value AVERAGE and a standard deviation STDEV of the measured black voltages. In addition, the difference VAR in which the process performance index Ppk is high and the out-of-specification ratio OOS is low may be determined as the difference VAR corresponding to the corresponding input luminance DBV.

Even though the difference VAR is determined experimentally, when the first power voltage ELVSS (refer to FIG. 3) is adjusted based on the input luminance DBV (refer to FIG. 3) as shown in the first range P1 (refer to FIG. 5) of FIGS. 3 and 5, the difference VAR may increase as the input luminance DBV (refer to FIG. 3) decreases.

Even though the difference VAR is determined experimentally, when the dimming level DIM (refer to FIG. 5) and the black voltage VB (refer to FIG. 5) based on the input luminance DBV (refer to FIG. 3) as shown in the second range P2 (refer to FIG. 5) of FIGS. 4 and 5, the difference VAR may decrease as the input luminance DBV (refer to FIG. 3) decreases.

Figure 7:
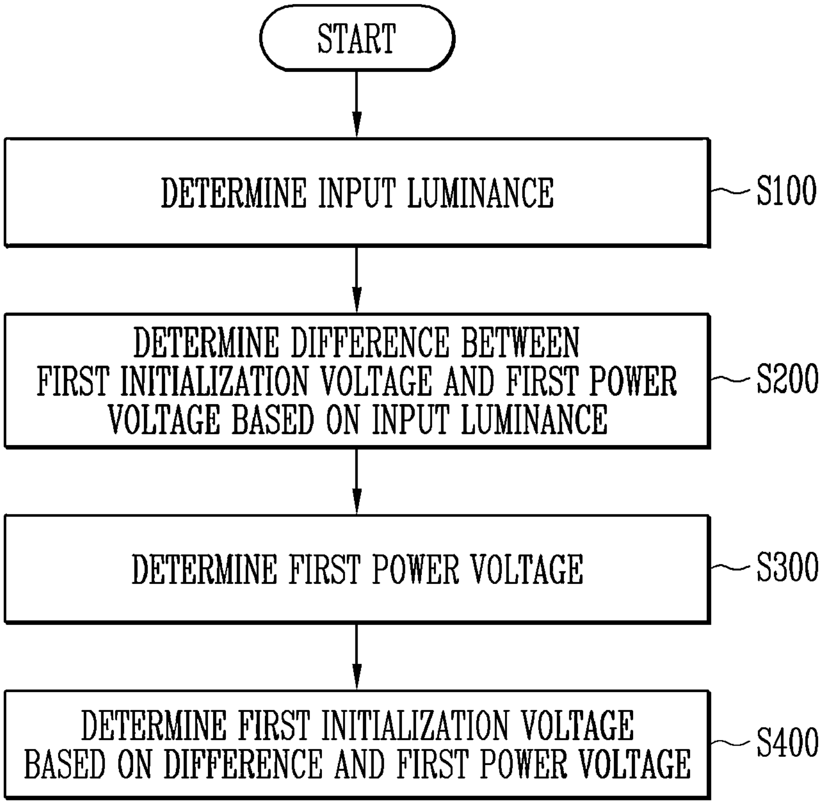
FIG. 7 is a flowchart illustrating a method of driving a display device according to embodiments of the disclosure.

FIG. 7 is a flowchart illustrating a method of driving a display device according to embodiments of the disclosure.

Referring to FIG. 7, an embodiment of the method of driving the display device may include determining an input luminance (S100), determining a difference between a first initialization voltage and a first power voltage based on the input luminance (S200), determining the first power voltage (S300), and determining the first initialization voltage based on the difference and the first power voltage (S400).

Since detailed features of each process of the method is substantially the same as those described above with reference to FIGS. 1 to 6, any repetitive detailed description thereof will be omitted.

Figure 8:
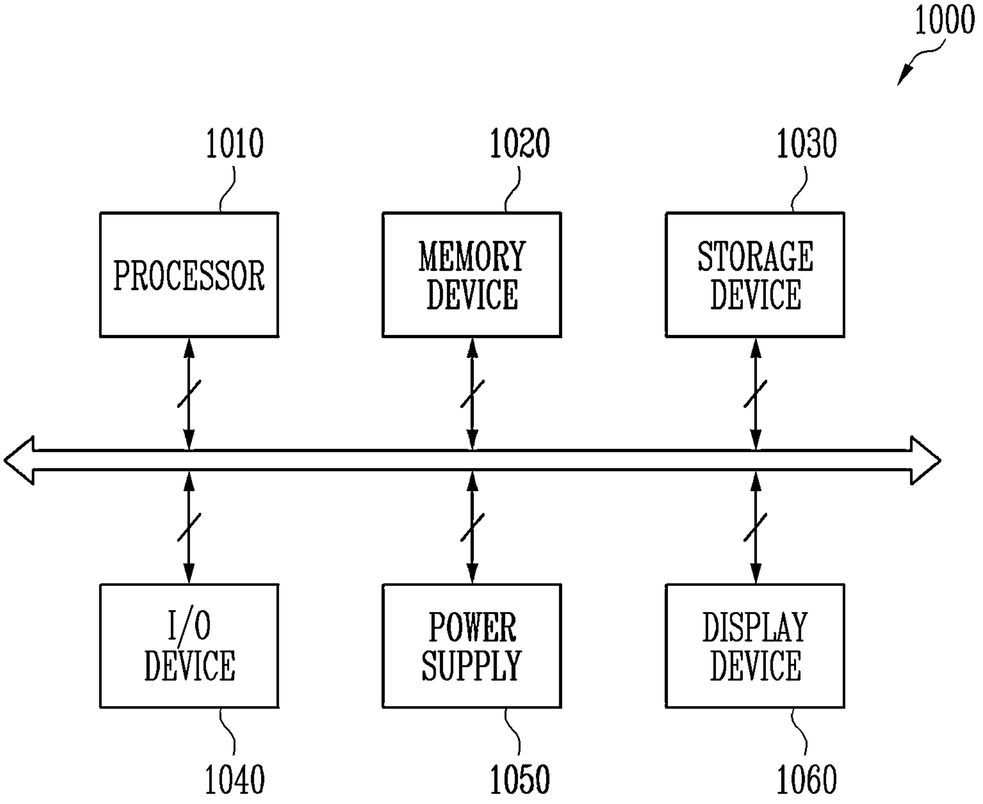
FIG. 8 is a block diagram illustrating an electronic device according to embodiments of the disclosure.
Figure 9:
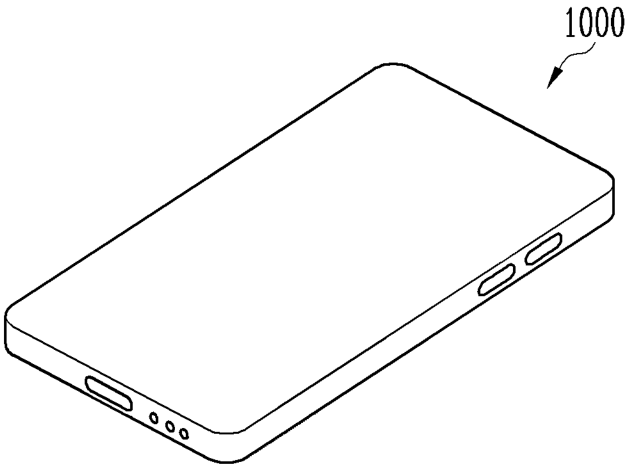
FIG. 9 is a diagram illustrating an example in which the electronic device of FIG. 8 is implemented as a smartphone.

FIG. 8 is a block diagram illustrating an electronic device according to embodiments of the disclosure, and FIG. 9 is a diagram illustrating an example in which the electronic device of FIG. 8 is implemented as a smartphone.

Referring to FIGS. 8 and 9, an embodiment of the electronic device 1000 may include a processor 1010, a memory device 1020, a storage device 1030, an input/output device 1040, a power supply 1050, and a display device 1060. In such an embodiment, the display device 1060 may be an embodiment of the display device described above with reference to FIGS. 1 to 9. In addition, the electronic device 1000 may further include several ports capable of communicating with a video card, a sound card, a memory card, a USB device, or the like, or communicating with other systems. In an embodiment, as shown in FIG. 9, the electronic device 1000 may be implemented as a smart phone. However, this is an example, and the electronic device 1000 is not limited thereto. For example, the electronic device 1000 may be implemented as a mobile phone, a video phone, a smart pad, a smart watch, a tablet computer, a vehicle navigation device, a computer monitor, a notebook computer, a head mounted display device, or the like.

The processor 1010 may perform specific calculations or tasks. According to an embodiment, the processor 1010 may be a microprocessor, a central processing unit, an application processor, or the like. The processor 1010 may be connected to other components through an address bus, a control bus, a data bus, or the like. According to an embodiment, the processor 1010 may also be connected to an expansion bus such as a peripheral component interconnect (PCI) bus.

The memory device 1020 may store data necessary for an operation of the electronic device 1000. For example, the memory device 1020 may include a non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM), and a ferroelectric random access memory (FRAM) device, a volatile memory device such as a dynamic random access memory (DRAM) device, a static random access memory (SRAM) device, and a mobile DRAM device, and/or the like.

The storage device 1030 may include a solid state drive (SSD), a hard disk drive (HDD), a CD-ROM, or the like.

The input/output device 1040 may include an input means such as a keyboard, a keypad, a touch pad, a touch screen, and a mouse, and an output means such as a speaker and a printer. According to an embodiment, the display device 1060 may be included in the input/output device 1040.

The power supply 1050 may supply power used for an operation of the electronic device 1000. In an embodiment, for example, the power supply 1050 may be a power management integrated circuit (PMIC).

The display device 1060 may display an image corresponding to visual information of the electronic device 1000. In an embodiment, the display device 1060 may be an organic light emitting display device or a quantum dot light emitting display device, but is not limited thereto. The display device 1060 may be connected to other components through the buses or other communication links.

The invention should not be construed as being limited to the embodiments set forth herein. Rather, these embodiments are provided so that this disclosure will be thorough and complete and will fully convey the concept of the invention to those skilled in the art.

Embodiments of the disclosure may be applied to a display device and an electronic device including the display device, for example, a digital television (TV), a three-dimensional (3D) TV, a mobile phone, a smart phone, a tablet computer, a virtual reality (VR) device, a personal computer (PC), a home electronic device, a notebook computer, a personal digital assistant (PDA), a portable media player (PMP), a digital camera, a music player, a portable game console, a navigation system, or the like.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:

a display panel including a pixel;

a data driver which provides a data voltage to the pixel;

a power voltage generator which provides a first initialization voltage and a first power voltage to the pixel; and a driving controller which controls the data driver and the power voltage generator, wherein the driving controller determines a difference between the first initialization voltage and the first power voltage based on an input luminance.

2. The display device according to claim 1, wherein the driving controller determines the first power voltage based on the input luminance and then determines the first initialization voltage based on the difference and the first power voltage.

3. The display device according to claim 1, wherein the first power voltage increases as the input luminance decreases, and the difference increases as the input luminance decreases.

4. The display device according to claim 3, wherein the power voltage generator further provides a second power voltage to the pixel, and the second power voltage is constant.

5. The display device according to claim 1, wherein the driving controller determines a dimming level and a black voltage based on the input luminance, and the first power voltage is constant.

6. The display device according to claim 5, wherein the dimming level decreases as the input luminance decreases, and the black voltage decreases as the input luminance decreases.

7. The display device according to claim 6, wherein the difference decreases as the input luminance decreases.

8. The display device according to claim 1, wherein the driving controller determines the first power voltage based on the input luminance when the input luminance is in a first range and then determines the first initialization voltage based on the difference and the first power voltage, and the first power voltage is constant when the input luminance is in a second range different from the first range.

9. The display device according to claim 8, wherein the input luminance in the second range is lower than the input luminance in the first range.

10. The display device according to claim 8, wherein the first power voltage when the input luminance is in the second range is higher than or equal to the first power voltage when the input luminance is in the first range.

11. The display device according to claim 8, wherein a dimming level and a black voltage are constant when the input luminance is in the first range.

12. The display device according to claim 8, wherein the first power voltage increases as the input luminance decreases when the input luminance is in the first range, and the difference increases as the input luminance decreases when the input luminance is in the first range.

13. The display device according to claim 8, wherein when the input luminance is in the second range, the driving controller determines a dimming level and a black voltage based on the input luminance.

14. The display device according to claim 13, wherein the dimming level decreases as the input luminance decreases when the input luminance is in the second range, and the black voltage decreases as the input luminance decreases when the input luminance is in the second range.

15. The display device according to claim 14, wherein the difference decreases as the input luminance decreases when the input luminance is in the second range.

16. The display device according to claim 1, wherein the pixel comprises:

a first transistor which generates a driving current;

a storage capacitor connected to a control electrode of the first transistor;

a second transistor which writes the data voltage to the storage capacitor;

a light emitting element which receives the driving current to emit light and receives the first power voltage; and a seventh transistor which provides the first initialization voltage to the light emitting element.

17. A method of driving a display device, the method comprising:

determining an input luminance;

determining a difference between a first initialization voltage and a first power voltage based on the input luminance;

determining the first power voltage; and determining the first initialization voltage based on the difference and the first power voltage.

18. The method according to claim 17, wherein the first power voltage is determined based on the input luminance when the input luminance is in a first range, the first power voltage is constant when the input luminance is in a second range different from the first range, and the input luminance in the second range is lower than the input luminance in the first range.

19. The method according to claim 18, wherein the first power voltage increases as the input luminance decreases when the input luminance is in the first range, and the difference increases as the input luminance decreases when the input luminance is in the first range.

20. The method according to claim 18, further comprising:

determining a dimming level and a black voltage based on the input luminance when the input luminance is in the second range, wherein the dimming level decreases as the input luminance decreases when the input luminance is in the second range, the black voltage decreases as the input luminance decreases when the input luminance is in the second range, and the difference decreases as the input luminance decreases when the input luminance is in the second range.

* * * * *